United States Patent
Robert et al.

(10) Patent No.: US 7,525,374 B2
(45) Date of Patent: Apr. 28, 2009

(54) MULTI-LEVEL DEMODULATION METHOD AND DEVICE

(75) Inventors: Gérard Robert, Poisat (FR); François Dehmas, Meylan (FR); Elisabeth Crochon, Poisat (FR); Jacques Reverdy, Crolles (FR)

(73) Assignee: Commissariat A l'Energie Atomique, Paris (FR)

( * ) Notice: Subject to any disclaimer, the term of this patent is extended or adjusted under 35 U.S.C. 154(b) by 350 days.

(21) Appl. No.: 11/386,551

(22) Filed: Mar. 21, 2006

(65) Prior Publication Data

US 2006/0225555 A1 Oct. 12, 2006

(30) Foreign Application Priority Data

Mar. 21, 2005 (FR) ................................. 05 50727

(51) Int. Cl.
*H04L 25/34* (2006.01)
(52) U.S. Cl. ...................................... 329/311; 375/287
(58) Field of Classification Search ......... 329/311–314; 375/286–294
See application file for complete search history.

(56) References Cited

U.S. PATENT DOCUMENTS

| 5,825,243 | A | | 10/1998 | Sato et al. |
| 6,078,627 | A | * | 6/2000 | Crayford .................. 375/286 |
| 6,173,018 | B1 | | 1/2001 | Kuroki |

FOREIGN PATENT DOCUMENTS

| FR | 2 853 479 A1 | 4/2003 |
| FR | 2 859 842 A1 | 9/2003 |
| JP | 07123121 | 12/1995 |

OTHER PUBLICATIONS

International Preliminary Report, EPO Form 1503, dated Oct. 25, 2005.

* cited by examiner

*Primary Examiner*—David Mis
(74) *Attorney, Agent, or Firm*—Nixon Peabody LLP (57) ABSTRACT

The invention relates to a method for demodulating information emitted by amplitude modulation by a reader (2) to a transponder (4) comprising:
- a step to compare variations of a slaving voltage ($V_c$) of the transponder (4) with threshold values, and to transform the result of this comparison into an authorized modulation level skip value,
- a step to add this skip to a previous first modulation level to determine a second modulation level.

9 Claims, 6 Drawing Sheets

MULTI-LEVEL DEMODULATION METHOD AND DEVICE

CROSS REFERENCE TO RELATED APPLICATION

This application claims priority to French Application No. 05 50727, filed on Mar. 21, 2005, entitled: "Multi-Level Demodulation Method and Device" by Gerard Robert, Francois Dehmas, Elisabeth Crochon and Jacques Reverdy and was not published in English.

TECHNICAL DOMAIN AND PRIOR ART

The invention relates to techniques for information exchanges between a fixed station (reader) and a contactless transponder (card, label) placed in the electromagnetic field emitted by the reader.

More precisely, the invention relates to a method of demodulating the modulation emitted by the reader, in the transponder.

Figure 1A:
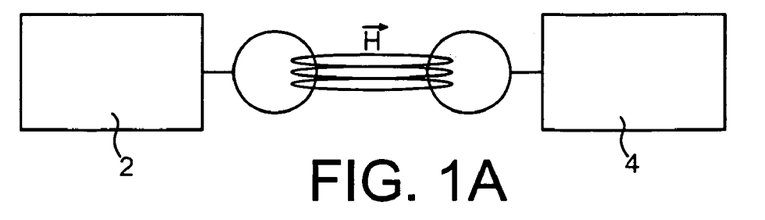
FIGS. 1A and 1B represent a reader—transponder system and the field emitted by a fixed station as a function of the value of the bit that it wants to transmit.

As illustrated in FIG. 1A, a reader 2 emits a radio frequency magnetic field, this field is used firstly by a transponder 4 to create its power supply voltage and secondly to exchange information. Conventionally, the reader 2 sends its information by amplitude modulation of this magnetic field (Amplitude Shift Keying or ASK).

Figure 1B:
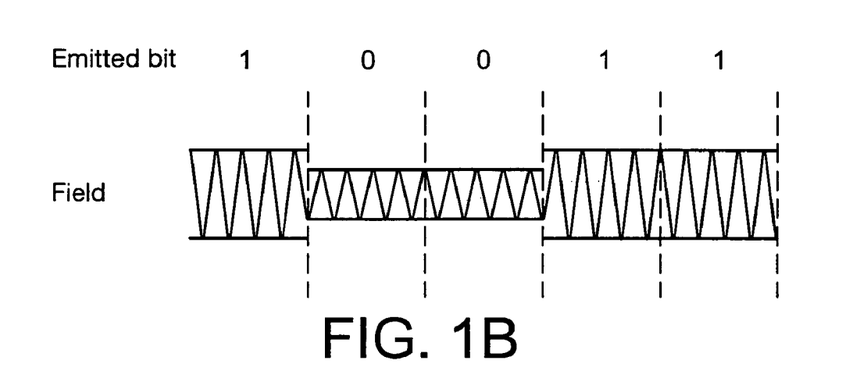

FIG. 1B shows the field emitted by a fixed station as a function of the value of the bit that it wants to transmit.

The flow rate of information exchanged between the fixed station 2 and the transponder 4 can be increased either by increasing the frequency of the modulating signal, or increasing the number of modulation amplitude levels.

Patent application No. 03 10928, not published on the date on which this application was submitted, describes a multi-level demodulation method using a single-bit analogue-digital converter with a high time resolution.

Figure 2A:
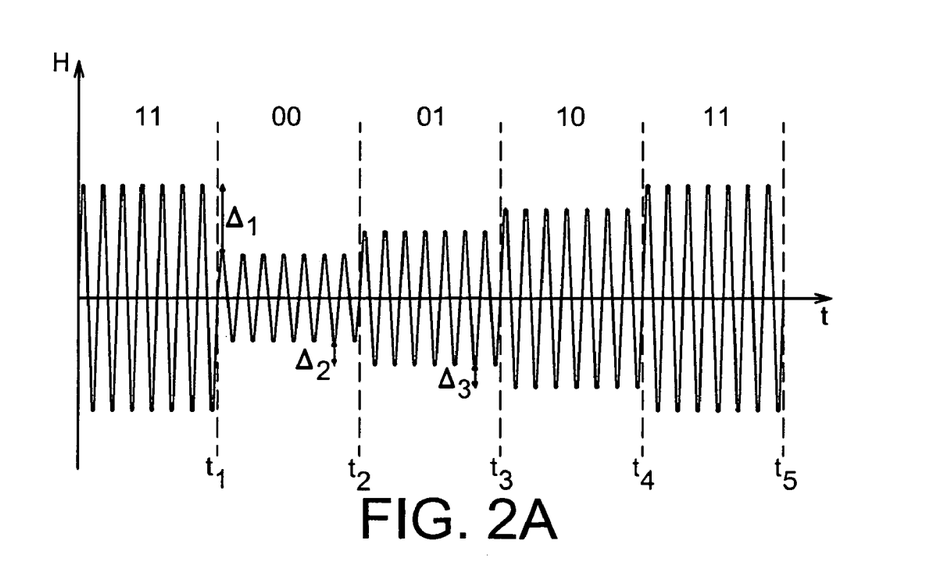
FIGS. 2A-2C illustrate a demodulation technique.
Figure 2B:
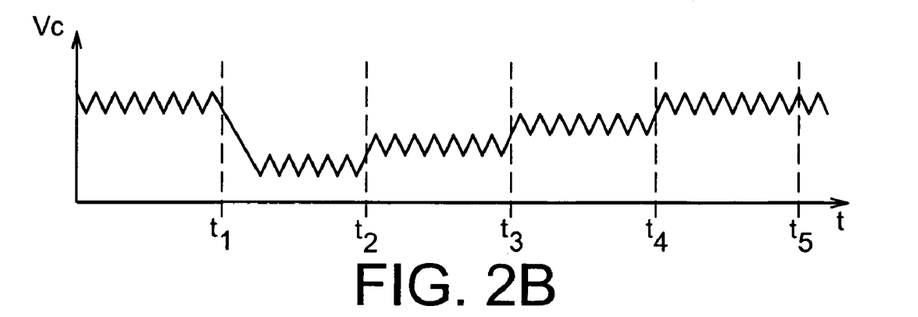
Figure 2C:
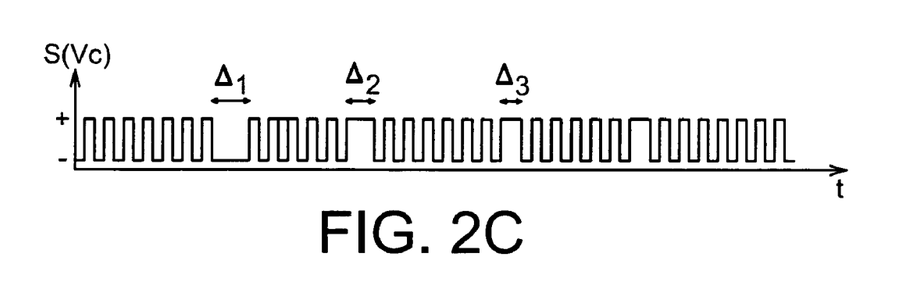

FIGS. 2A-2C briefly summarize operation of this single-bit converter defined in document No. FR 03 10928.

In these figures:
H represents the field modulated by the reader (FIG. 2A),
$V_c$ is the control voltage supplied by the transponder 4 integrator (FIG. 2B), the amplitude of this voltage is representative of the amplitude level of the magnetic field H and therefore the data to be transmitted;
$S(V_c)$ is the sign of the variation of the control voltage $V_c$ of a regulation loop of the transponder (FIG. 2C).

The sign signal $S(V_c)$ is the signal used to find information emitted by the fixed station 2.

In this method, the direction of variation of the slaving voltage of an analogue/digital converter is used (demodulator of the transponder 4) to determine the modulation level.

The length of identical bit sequences $S(V_c)$ is compared with thresholds so as to obtain information about the value of the difference between the existing modulation level and the previous modulation level.

In this method, the signal to noise ratio is too high and the transponders can only be read within a very narrow field area.

Therefore the problem arises of finding a new device and a new method for solving these sensitivity and range problems.

PRESENTATION OF THE INVENTION

The invention proposes a method for demodulating a signal amplitude modulated by a reader and sent to a transponder, in the case in which the number of levels N is greater than or equal to 2.

The invention relates firstly to a method for demodulating information emitted by amplitude modulation by a reader to a transponder comprising:
a step to compare variations of a slaving voltage ($V_c$) of the transponder with threshold values, and to transform the result of this comparison into an authorized modulation level skip value,
a step to add this skip to a first previous modulation level to determine a second modulation level.

Threshold values can also be associated with each modulation level.

Threshold values may have been stored in advance.

According to the invention, values adapted to the device being used can be stored in storage means or in a threshold reference table such as a comparator reference table, instead of theoretical values for these thresholds, so that non-linearities due to skip differences from one level to another can be corrected.

Before sending each signal from the reader to the transponder, a preamble can be sent containing all possible skips for all modulation levels so as to establish threshold values.

Thresholds can be established during a previous step; for example, a signal containing all possible skips can be sent, the transponder measures the corresponding values and a bijection can be established between all real skips for all levels, and all threshold values that will be stored in the reference table.

For example, there are 6 possible thresholds (−3, −2, −1, +1, +2, +3) for four levels. Theoretically, all these thresholds are identical for each level. However, the reality is quite different; thresholds vary from one level to another due to system non-linearities; in other words, the +1 displacement from a first level, for example level 2, does not necessarily have the same amplitude as the +1 displacement starting from a second level, for example level 0. The result is errors during the demodulation.

Therefore, an attempt is made to find real values of all possible skips to determine real thresholds.

For example in the case of 4 levels, the table contains 24 values instead of 6 thresholds (6 values per level).

Furthermore, not all displacements are allowed. For example, still for 4 levels, if the previous symbol is level 1, all that are allowed are the −1, +1, +2 displacements. Therefore, there will be prohibited values in the reference table.

Therefore, the invention also relates to a method for demodulating information emitted by amplitude modulation by a reader to a transponder, for example an RFID card or label comprising a step to compare variations of a demodulator slaving voltage with threshold values, and comprising a preliminary step to physically measure the value of these thresholds.

The invention also relates to a device for demodulating information emitted by amplitude modulation by a reader to a transponder, such as an RFID label, comprising:
means of storing values of possible variations of a slaving voltage signal, for each level of the said modulation, starting from this level,
means of calculating the corresponding real variation at each transition, and of calculating the new signal level as a function of a previous signal level.

It may also comprise means forming an antenna, load impedance means at the antenna terminals, and means forming a voltage regulation loop at the terminals of the load impedance.

According to one embodiment, the means forming regulation may comprise means of rectifying the voltage at the antenna terminals, and control means to modify the impedance as a function of the output from the rectification means.

Demodulation means may comprise analogue-digital conversion means between the control means and the rectification means.

DETAILED PRESENTATION OF PARTICULAR EMBODIMENTS

Note that the following vocabulary will be used to make the description clearer:

- symbols used: the number of symbols is related to the number of bits emitted simultaneously by the base station 2 (FIG. 1A); if this number of bits is N, $2^N$ different symbols will be necessary,
- the modulation level is the peak value of the electromagnetic field emitted by the reader 2. There must be at least one modulation level for each different symbol. The modulation level is coded from $(2^N-1)$ to 0,
- the skip is a signed number (+d, or –d, where d is a natural number) indicating the difference between the modulation level of the symbol $T_n$ and of the symbol $T_{(n+1)}$.
- the duration of a symbol is the transfer time of a symbol between the reader and the transponder.

Figure 3A:
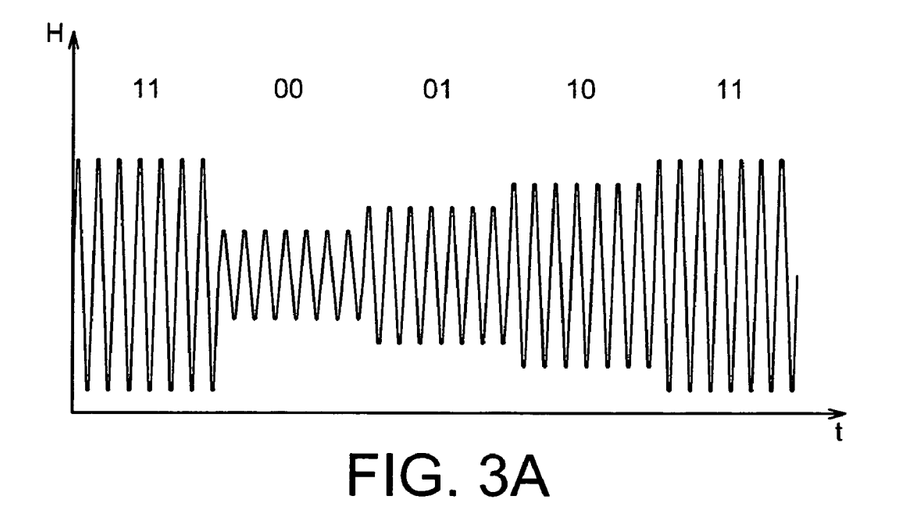
FIGS. 3A and 3B illustrate a sequence of symbols and corresponding modulation levels.
Figure 3B:
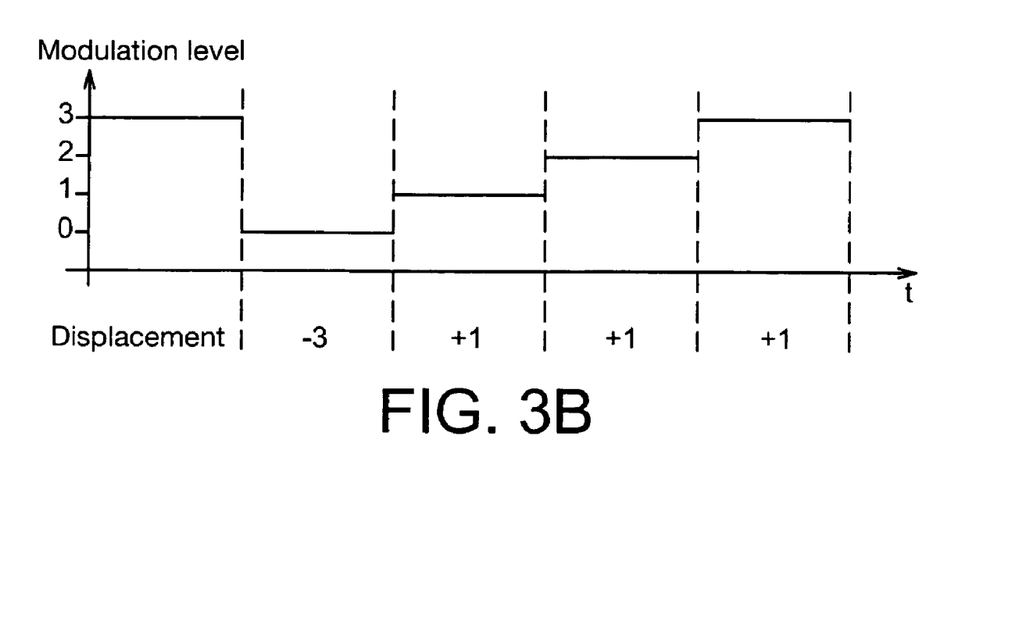

FIGS. 3A and 3B illustrate these reminders for a symbol composed of 2 bits; four different modulation levels are then used.

According to the invention, any possible displacement or skip from each modulation level is previously identified and stored, for example using a so-called preamble signal (an example of which is given later with reference to FIG. 6) and that contains all possible skips starting from each modulation level.

Therefore, the real variation levels, or the real skips, are identified starting from each modulation level, and a threshold value is assigned to each of these real skips.

The largest allowable skip value is assigned to positive measured skips outside the range of possible skips, and the smallest allowable skip value is assigned to negative measured skips outside the range of possible skips.

Figure 4:
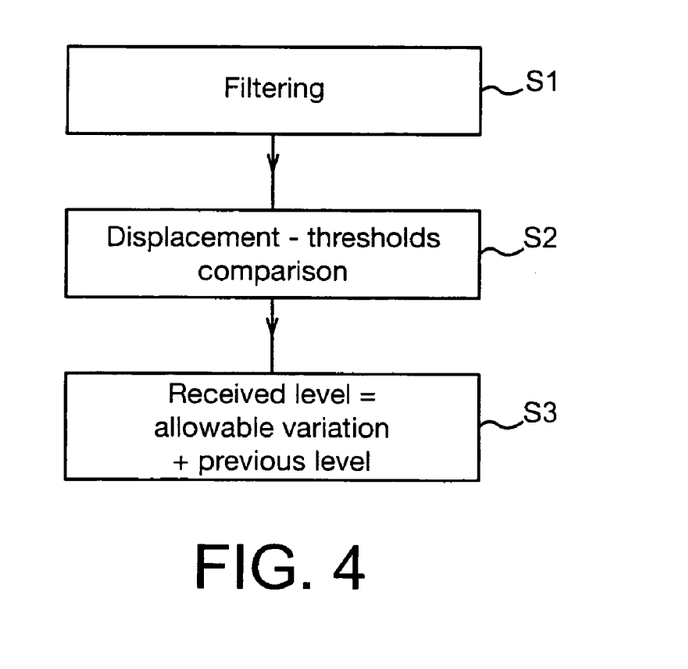
FIG. 4 represents different steps in a method according to the invention.

For example, FIG. 4 illustrates a demodulation method according to the invention:

a) The first step is low pass filtering of the sign signal $V_c$ (step S1), this sign signal being shown as an example in FIG. 2C, b) each value of the filtered signal is compared with thresholds to determine the variation of the detected field (step S2), c) the received level is calculated from the variation of the skip and the previous level (step S3).

Therefore, a method according to the invention for demodulating information sent by amplitude modulation of a signal by a reader to a transponder, can comprise:

- for each skip from a given level of the said modulation, identification of the possible variation values starting from this level,
- determination of the skip and then calculation of the new modulation level as a function of the previous modulation level and the skip value.

Figure 5A:
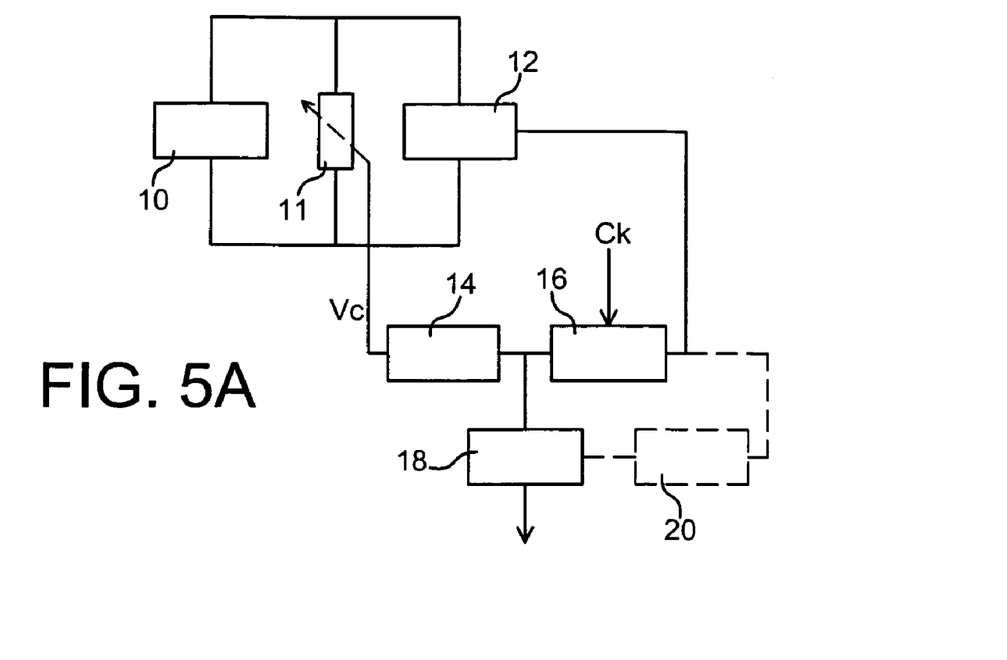
FIGS. 5A-5B illustrate a device according to the invention.
Figure 5B:
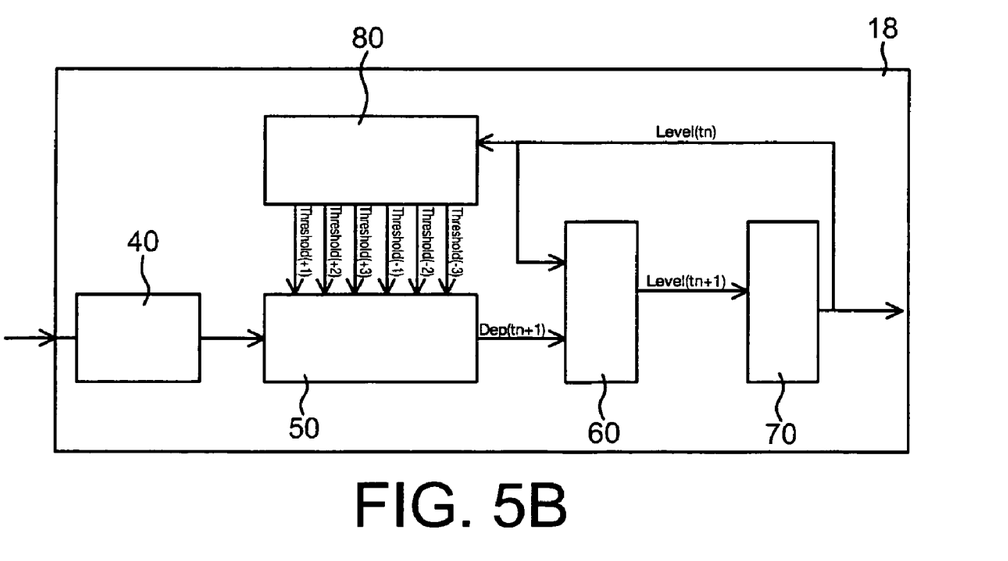

A method according to the invention can be implemented digitally in a transponder, for example using a filter, the output from the filter being sent to a device for example like that illustrated in FIG. 5B.

FIG. 5A shows part of the transponder device 4 comprising means 10 forming a reception antenna, means 12 forming a rectification circuit, means 16 forming an analogue-digital converter and control means 14.

These control means produce a control voltage of a load impedance 11.

A digital processing circuit 18 provides digital signals representative of the transmitted data.

The n-bit converter 16 is located in the regulation loop between the rectification means 12 and the control means 14. The converter 16 is preferably a single-bit converter (n=1), that may comprise a simple comparator. A very low resolution is thus obtained which minimizes the number of components, and that is compensated by a high resolution in time obtained by clocking the converter 16 at an over sampling frequency very much higher than the frequency of data transmitted by the fixed station 2.

For example, the over sampling frequency may be determined by a clock circuit outputting clock signals $C_k$ at a clock input to the converter 16. For example, for a data frequency of the order of 200 kHz, the over sampling frequency may advantageously be between 10 and 20 MHz.

Although the digital output signals from the converter 16 contain information necessary for the recovery of data transmitted by the fixed station 2, these digital signals are not directly useable.

Therefore, the output from the converter 16 connected to the control circuit 14 is connected to the input of a digital processing circuit 18 that will provide demodulated data on N bits.

Operation of the demodulation circuit of the portable object in FIG. 5A is illustrated by signals shown in FIGS. 2A and 2B in the case in which the low resolution analogue-digital converter 16 included in the regulation loop of the AC voltage Vac at the terminals of the antenna 10, consists of a simple comparator outputting a sequence of bits at the over sampling frequency. The control circuit 14 comprises an integrator outputting an analogue voltage signal Vc representative of the n-bit output signals from the converter 16.

For example, this signal is in the shape of an upward voltage ramp when the output from the means 16 is equal to 1 and a downward voltage ramp when this output is equal to zero. Therefore, the control voltage $V_c$ obtained at the output from the control means 14 is never static. Thus, after a transient period during which the regulation loop is in an equilibrium position, the control voltage Vc is in the shape of a saw tooth with its average level (see FIG. 2B) proportional to the level of the electromotive force, in other words it is proportional to the level of the magnetic field emitted by the fixed station 2 and consequently representative of data transmitted by this fixed station 2.

In the example illustrated in FIGS. 2A-2B, the magnetic field H varies between times $t_0$ and $t_5$. The change in the amplitude level of this field H provokes a change in the level of the electromotive force and consequently a fast variation (decreasing at time $t_1$ and increasing at times $t_2$, $t_3$ and $t_4$) of the AC voltage $V_{ac}$ generated at the terminals of the antenna 10 and the load impedance 11.

In this example, a reduction in the level of the magnetic field H causes emission of a longer sequence of consecutive zeros than during slaving, causing a reduction in the average amplitude of the control voltage $V_C$. Similarly, an increase in the level of the emitted magnetic field results in emission of a longer sequence of consecutive "1" bits than during slaving, causing an increase in the average amplitude of the control voltage $V_C$. The number or consecutive 0 or 1 bits increases with the amplitude of the skip in the electromotive force.

Therefore, digital output signals from the converter 16 contain information representative of the sign and the amplitude of the variation in the level of the emf generated by the field H, in other words information representative of the derivative of the envelope of the electromotive force or the magnetic field. Therefore the digital processing circuit 18 comprises at least one digital integration function. The integration functions of the control circuit 14 and/or the digital processing circuit 18 can be done using integrators and/or low pass filters.

Thus, the regulation loop in FIG. 5A simultaneously performs part of the analogue conversion which makes the assembly more compact. Furthermore, the effect of slow variations at the average magnetic field due to a movement of the portable object 1, is attenuated by the fact that the output information from the converter 16 is representative of the derivative of the envelope of the magnetic field. Therefore, slow variations in the average field are dealt with as noise and do not disturb demodulation.

FIG. 5B gives an example embodiment of a device according to the invention, for a multi-level demodulation using the calculation of displacement thresholds for each level.

Such a device comprises means 50 for comparing the output from the filter 40 (which is located at the input to the digital processing block 18, FIG. 5B) with threshold values output from a threshold table 80.

Figure 6:
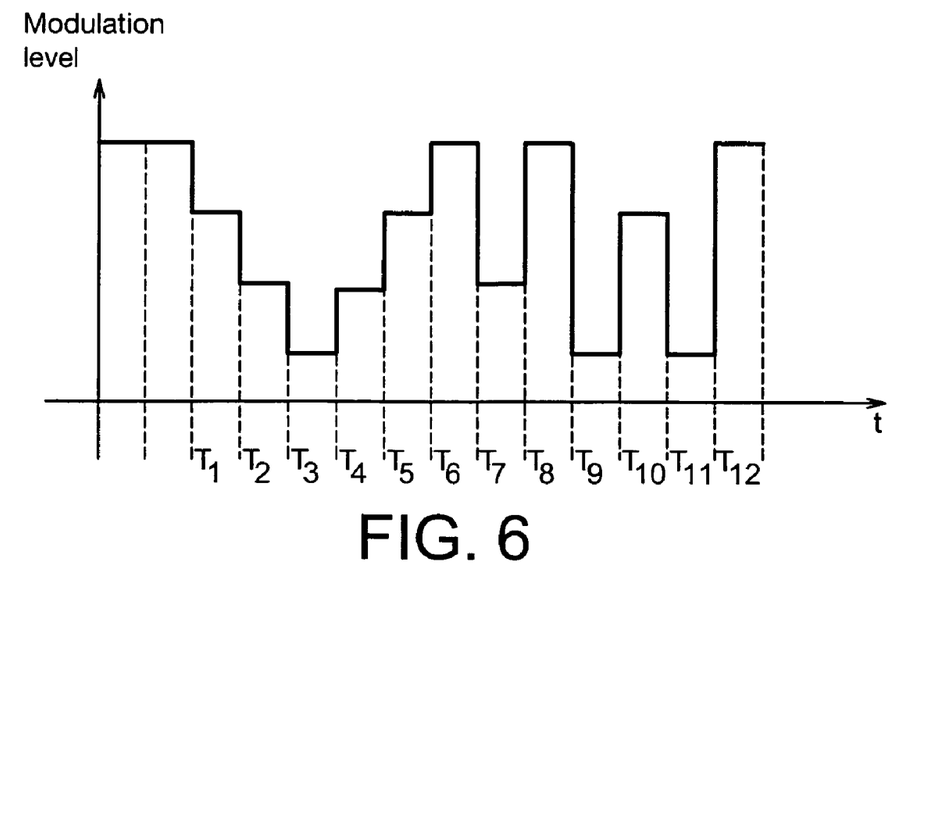
FIG. 6 represents a preamble example.

For example, this threshold table may be powered during a phase or preamble that comprises all possible displacements as illustrated in FIG. 6. The set of corrected or allowable displacements is associated with the set of these possible displacements.

The means 60 are adder means, while the reference 70 denotes a register.

During operation, the working frequency is the symbol frequency. At time $t_{n+1}$, the threshold table 80 is addressed by the value of the modulation level during time $t_n$. Therefore, this value gives the modulation level that was previously calculated for time $t_n$.

Furthermore, the output from filter 40 is compared with the thresholds contained in the table 80, and the output from the comparator 50 gives the skip dep($t_{n+1}$) using the logic described above. This skip is added to the time ($t_n$) to give the level received at time $t_{n+1}$.

Figure 7:
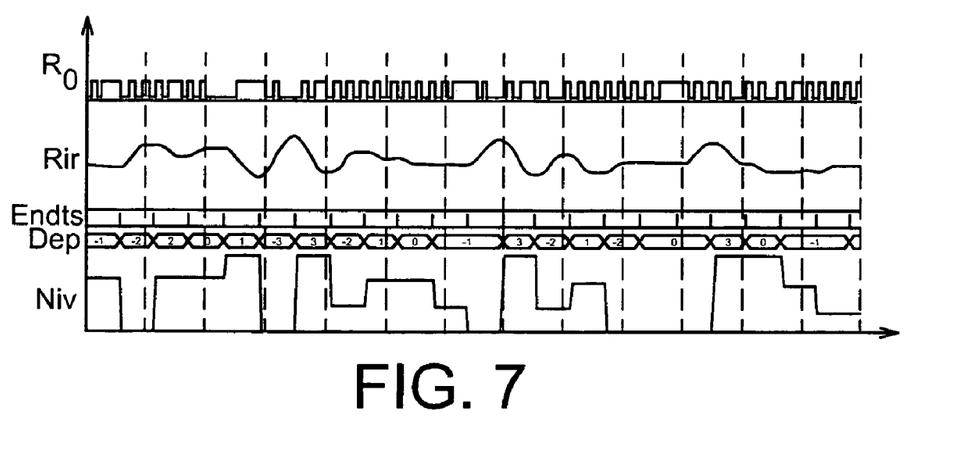
FIG. 7 represents signals obtained at different steps in the treatment according to the invention.

FIG. 7 illustrates the signals obtained during each step in the processing:
$B_0$ represents the signal at the output from the converter 16,
Fir represents the output from the filter,
Endts represents the symbol duration,
Dep represents the variation in the detected field,
Niv represents the field detected by the transponder.

The output from filter Fir is compared with the thresholds at each pulse Endts representative of the symbol frequency. The skips Dep from which the modulation level Niv is deduced are then obtained.

We will illustrate this method with an example.

Figure 8:
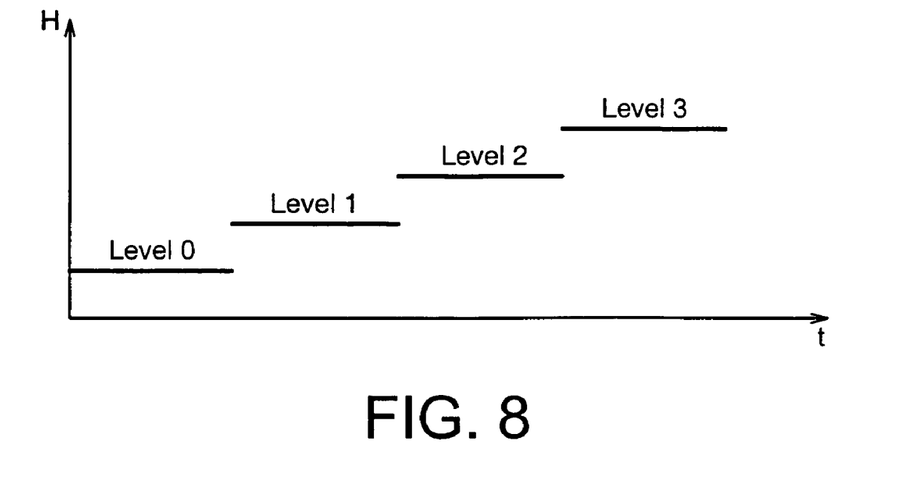
FIGS. 8 and 9 represent a 4-level system according to the invention, and results of comparison between a filter output and thresholds.
Figure 9:
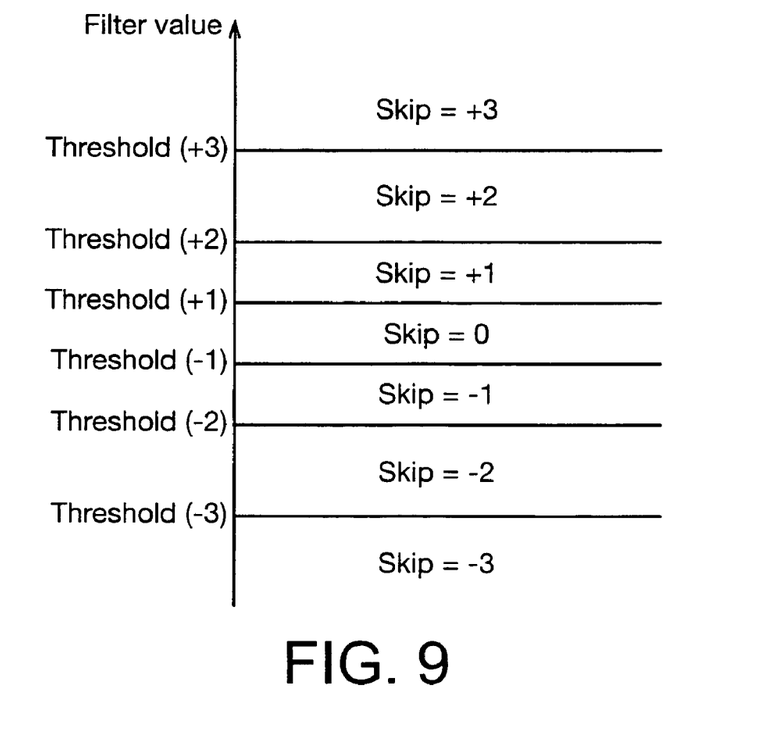

This example relates to a 4-level modulation, the levels being denoted from 0 to 3, and represented diagrammatically in FIGS. 8 and 9.

The possible relative displacements or skips starting from the different levels are:
  starting from Level 0: +1 (level 0=>1), +2 (level 0=>2), +3 (level 0=>3),
  starting from Level 1: +1 (level 1=>2), +2 (level 1=>3), −1 (level 1=>0),
  starting from Level 2: +1 (level 2=>3), −1 (level 2=>1), −2 (level 2=>0),
  starting from Level 3: −1 (level 3=>2), −2 (level 3=>1), −3 (level 3=>0).
  A priori, only 6 thresholds (+1, +2, +3, −1, −2, −3) are necessary for a 4-level modulation. The new modulation level, and therefore the value of the symbol emitted by the reader, can be calculated by comparing the output from the filter with these 6 levels, provided that the previous level is known.

The skip may be calculated as follows:

```
if filter > threshold(+3) then skip = +3 ;
    else, if threshold(+3) > filter > threshold(+2)
then skip = +2 ;
    else, if threshold(+2) > filter > threshold(+1)
then skip = +1 ;
    else, if threshold(+1) > filter > threshold(−1)
then skip = 0 ;
    else, if threshold(−1) > filter > threshold(−2)
then skip = −1 ;
    else, if threshold(−2) > filter > threshold(−3)
then skip = −2 ;
    else : skip = −3.
```

As already mentioned above, the thresholds for each level are not identical and are not necessarily distributed linearly, and the converter in the transponder is not perfectly linear. In other words, the fact that each level only has 3 possible skips is not taken into account (+ the zero skip).

As explained above, according to the invention, the thresholds specific to each allowable skip can be calculated in advance for each level, to overcome non-linearity defects.

For example, a transaction between reader 2 and transponder 4 then begins with a preamble defined such that it contains all relative skips that exist for all possible levels.

Thus, the transponder will be able to define all real skip thresholds during this phase.

FIG. 6 gives an example preamble for the case of 4 levels emitted by the reader 2 before a transaction, to identify its inherent skip thresholds for each level.

Table I shows the threshold(s) calculated for level (n), for each $T_i$.

TABLE I

| Ti | Threshold(s) | Level (n) |
|---|---|---|
| T1 | −1 | 3 |
| T2 | −1 | 2 |
| T3 | −1 | 1 |
| T4 | +1 | 0 |
| T5 | +1 | 1 |
| T6 | +1 | 2 |

TABLE I-continued

| Ti | Threshold(s) | Level (n) |
|---|---|---|
| T7 | −2 | 3 |
| T8 | +2 | 1 |
| T9 | −3 | 3 |
| T10 | +2 | 0 |
| T11 | −2 | 2 |
| T12 | +3 | 0 |

The result is a table with 12 coefficients (3 coefficients for each of the 4 levels).

This table may be extended as follows, to take account of skips prohibited for each level:

for prohibited positive skips, the largest possible value of the filter calculation;

for prohibited negative skips, the smallest possible value of the filter calculation.

The result is then a table with 24 coefficients (6 thresholds for each of the 4 levels).

Threshold ($T_i$) represents the calculated or allowable threshold at time $T_i$ (see Table I and FIG. 7).

Therefore, application of the method described above leads to the following table II:

TABLE II

| Threshold(+1)_level(0) | Threshold (t4) |
|---|---|
| Threshold(+2)_level(0) | Threshold (t10) |
| Threshold(+3)_level(0) | Threshold (t12) |
| Threshold(−1)_level(0) | −256 |
| Threshold(−2)_level(0) | −256 |
| Threshold(−3)_level(0) | −256 |
| Threshold(+1)_level(1) | Threshold (t5) |
| Threshold(+2)_level(1) | Threshold (t8) |
| Threshold(+3)_level(1) | +255 |
| Threshold(−1)_level(1) | Threshold (t3) |
| Threshold(−2)_level(1) | −256 |
| Threshold(−3)_level(1) | −256 |
| Threshold(+1)_level(2) | Threshold (t6) |
| Threshold(+2_level(2) | +255 |
| Threshold(+3)_level(2) | +255 |
| Threshold(−1)_level(2) | Threshold (t2) |
| Threshold(−2)_level(2) | Threshold (t1) |
| Threshold(−3)_level(2) | −256 |
| Threshold(+1)_level(3) | +255 |
| Threshold(+2)_level(3) | +255 |
| Threshold(+3)_level(3) | +255 |
| Threshold(−1)_level(3) | Threshold (t1) |
| Threshold(−2)_level(3) | Threshold (t7) |
| Threshold(−3)_level(3) | Threshold (t9) |

If the filter is calculated on 9 bits, the −256 threshold is prohibited and the minimum level will be assigned to it, and the +255 threshold is prohibited and the maximum level will be assigned to it.

The proposed digital demodulation makes it possible to efficiently use the output from a sigma delta converter 20 set as illustrated in FIG. 5A (between the input to converter 16 and an input to the digital processing circuit 18). This converter increases the resolution of the demodulation by reducing the influence of quantification noise generated by the converter 16.

Furthermore, in the case of multi-levels (number of levels strictly greater than 2), the management of different thresholds by level and management (or correction) of prohibited skips significantly improve the signal-to-noise ratio and increase the demodulation quality.

A system according to the invention was produced with a symbol duration of 1.18 µs, 4 levels per symbol (namely 2 bits per symbol). Such a system has been used for a data transmission at 1.7 Mbits/S.

The invention claimed is:

1. Method for demodulating information emitted by amplitude modulation by a reader (2) to a transponder (4) comprising:

comparing variations of a slaving voltage ($V_c$) of the transponder (4), with threshold values; transforming the result of said comparison into an authorized modulation level skip value; and adding the skip value to a first previous modulation level to determine a second modulation level.

2. Method according to claim 1, in which threshold values are associable with each modulation level.

3. Method according to claim 1, the allowable threshold values having been stored in advance.

4. Method according to claim 3, including sending a preamble containing all possible skips for all modulation levels, before sending each signal from the reader (2) to the transponder (4).

5. Method according to claim 1 further including calculation of a new slaving voltage ($V_c$) as a function of the previous voltage level and the authorized variation value, for each slaving voltage level.

6. Device for demodulating information emitted by amplitude modulation by a reader to a transponder, comprising:

means (80) of storing values of possible variations of a slaving voltage signal, for each level of the said modulation, starting from a first level, means (50, 60, 70) of calculating a corresponding allowable level skip during each transition, and of calculating a new slaving voltage signal level as a function of a previous signal level.

7. Device according to claim 6, further comprising means (10) forming an antenna, load impedance means (11) at the antenna terminals, and means (12, 16, 14) forming a voltage regulation loop at the terminals of the load impedance.

8. Device according to claim 7, the means forming regulation comprising means (12) of rectifying the voltage at the antenna terminals, and control means (14) to modify the impedance as a function of the output from the rectification means (12).

9. Device according to claim 8, also comprising demodulation means comprising analogue-digital conversion means (16) between the control means (14) and the rectification means (12).

\* \* \* \* \*